Dec. 21, 1948.  J. G. SJOBERG  2,456,744
UNIVERSAL PIPE COUPLING
Filed Jan. 11, 1947  2 Sheets-Sheet 1

INVENTOR.
JOHN G. SJOBERG
BY
HIS ATTORNEYS

Dec. 21, 1948.  J. G. SJOBERG  2,456,744
UNIVERSAL PIPE COUPLING
Filed Jan. 11, 1947  2 Sheets-Sheet 2

INVENTOR.
JOHN G. SJOBERG
BY
HIS ATTORNEYS

Patented Dec. 21, 1948

2,456,744

UNITED STATES PATENT OFFICE 2,456,744

UNIVERSAL PIPE COUPLING

John G. Sjoberg, Oakland, Calif., assignor to Pacific Coast Engineering Company, Alameda, Calif., a corporation of California Application January 11, 1947, Serial No. 721,640

5 Claims. (Cl. 285—94)

My invention relates to universal pipe couplings and more particularly to the means for uniting the components of such coupling into an assembly, and constitutes an improvement upon the couplings of Plummer Patents No. 1,397,145 and No. 1,946,110.

The present invention is particularly pertinent to the coupling of pipe sections of large diameter of the order of 30" or so, such as are employed in construction dredging or the like where pipes are carried on pontoons or other supports exposed to the fluctuating movements of waves, which movements must be contended with in effecting the necessary coupling of pipe sections.

Among the objects of my invention are:

(1) To provide a novel and improved universal pipe coupling;

(2) To provide a novel and improved universal pipe coupling designed to facilitate the coupling of pipe sections of large diameter;

(3) To provide a novel and improved universal pipe coupling of simplified but efficient design;

(4) To provide a novel and improved bolt-clamping means for a universal pipe coupling;

(5) To provide a novel and improved bolt-clamping means for a universal pipe coupling designed to facilitate the coupling of pipe sections even when carried upon an unstable support such as a pontoon exposed to wave motion.

Additional objects of my invention will be brought out in the following description of a preferred embodiment of the same taken in conjunction with the accompanying drawings wherein—

Figure 1:
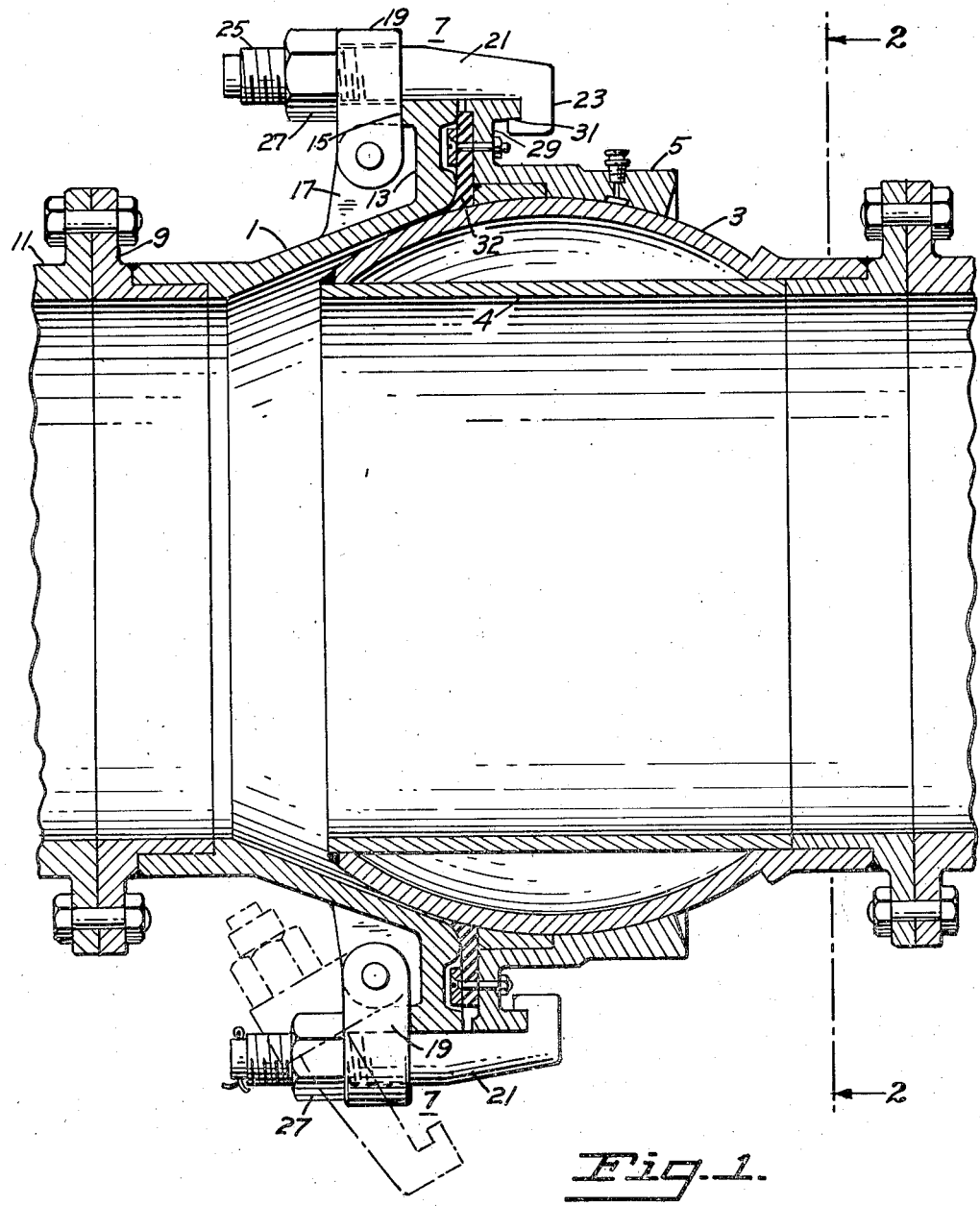
Figure 1 is a view in section through an assembled coupling embodying the features of my invention.
Figure 2:
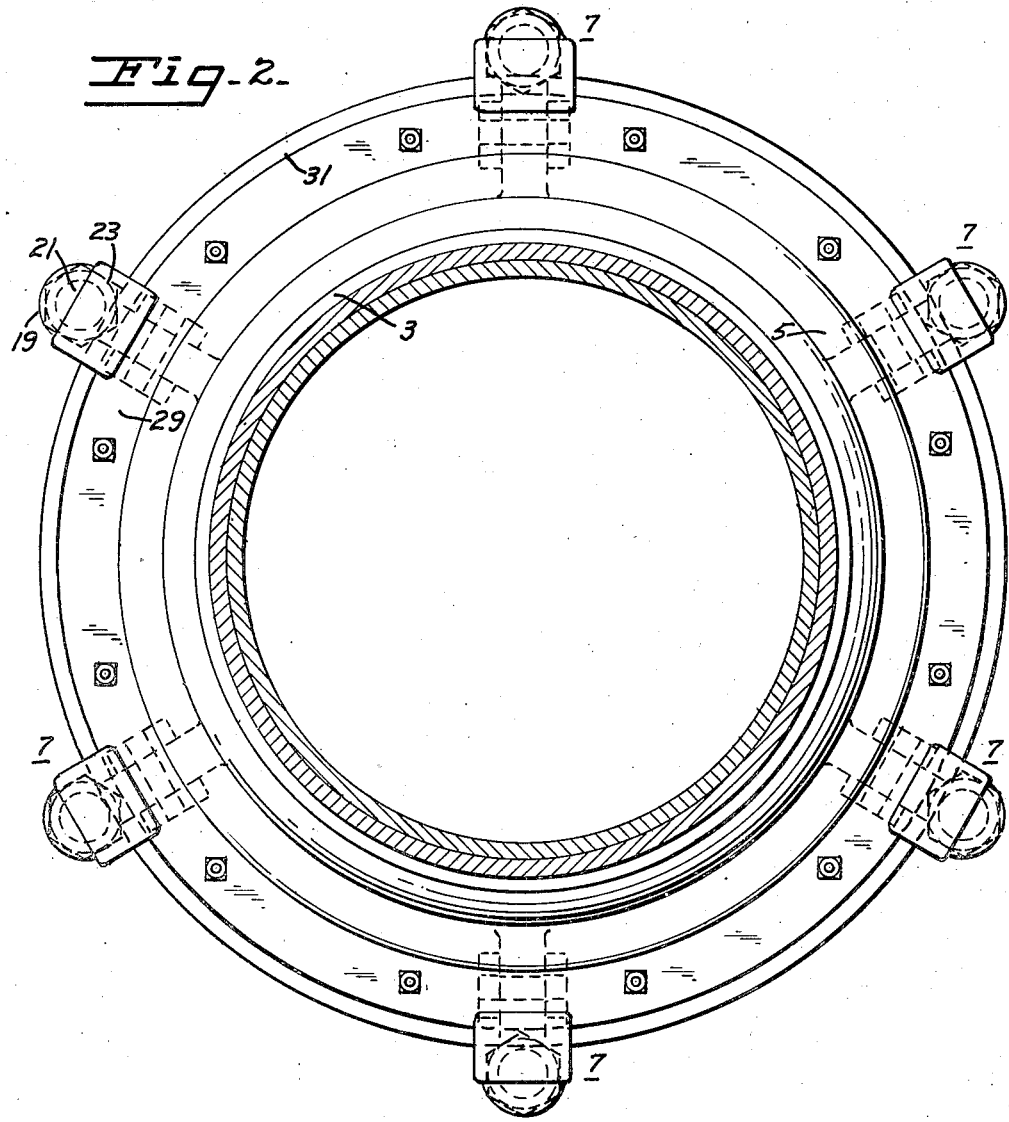
Figure 2 is a view in section taken in the plane 2—2 of Figure 1.
Figure 3:
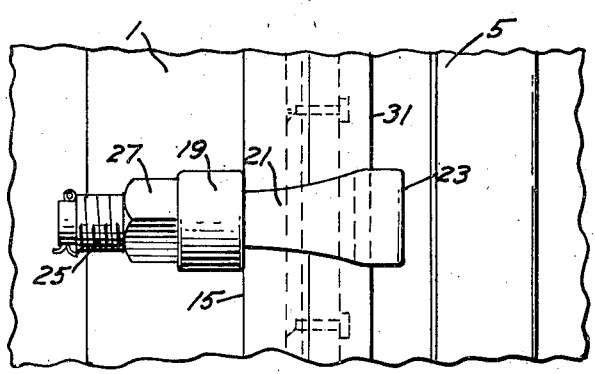
Figure 3 is a plan view of one of the clamping bolts in its relationship to the coupling structure.

With respect to the preferred embodiment of my invention, it is illustrated in the drawings as embodied in that type of coupling including as its major components, a bell section 1, a ball section 3, with or without a liner 4, receivable therein, such ball section being held in assembled position by a ring section 5 encircling the crown or mid-portion of the ball section, and clamping means 7 serving to clamp the ring section to the bell section whereby to hold all the components of the coupling in proper assembled relationship to one another.

The bell section at its smaller diameter end may be welded to a pipe flange 9 for bolting to a pipe section 11 while at its flared end, it terminates in a lateral flange 13 which is preferably broadened at its outer edge to provide a shoulder 15.

At peripherally disposed locations adjacent this flange, are fixed lugs 17, each of such fixed lugs being either integrally formed with or welded to the bell section, and is perforated to pivotally support a bolt carrying lug 19 adapted, when in a position normal to the axis of the bell section, to engage the shoulder 15 on the flange 13.

Each of these pivotally mounted lugs has a passage therethrough for slidably receiving a hook bolt 21, such bolt terminating at its head end in a hook 23, while the tail end 25 of the bolt is threaded for the reception of a tightening nut 27. The hooked end of each bolt is preferably broadened out to a dimension greater than the diameter of the passage through each of the pivotally mounted lugs whereby only the tail end may pass through the lug. With the nut threaded thereon, after thus assembling the bolt, accidental loss of the bolt becomes an improbability. A cotter pin through the tail end will absolutely assure against such loss.

The ring section 5 may be cast as one piece and shrunk into position about the ball section, or may be formed of a main portion capable of being slipped over one end of the ball section, and an insert capable of being assembled over the other end to meet the main section along the apex of the crown, following which the insert may be welded to the main section. In any event, the ring section is designed to terminate in a flange 29 facing the flange of the bell section, such flange being preferably continuous and forming a complete circle, and terminating along its outer edge in a rearwardly directed peripheral lip 31.

The bolts are adapted to hook under such lip and upon tightening the nut on each bolt into pressure engagement with the lug in which the bolt is mounted, the components of the universal pipe coupling will be drawn into assembly with each of the lugs braced solidly against the shoulder on the bell section flange.

It is noted in this connection that the initial hooking of the bolt to the flange lip will serve to discourage separation of the coupling components, while the operator is in the process of tightening the nut on the bolt.

A suitable sealing gasket 32 or other sealing means may be interposed between the flanges prior to the tightening procedure, to effectively seal the coupling against undesired leakage.

In assembling the ball section to the bell section, interference from the clamping bolt is to be avoided if the job is to be completed with a minimum of difficulty and waste of time. By providing the slidable fit between the bolt and the pivotally mounted lug which carries the bolt, the upper and lower bolts may be each initially positioned so as to bring its center of gravity to either one side or the other of the center line of the lug. The significance of this may be seen from the fact that through such permissible adjustment, both the upper and lower bolts may be caused to tilt backward under the force of gravity, so as to be temporarily out of the way when the components of the coupling are brought together. With respect to any side bolts, gravity will have no effect thereon and consequently when tilted manually, they will hold such tilted position.

Following the assembling of the ball section into the bell section, the bolts are swung into clamping position and tightened. Such swinging of the bolts involves very little effort on the part of the workmen even under most adverse working conditions, for the simple reason that the bolts are more or less in balance at all times, at no time being so far out of balance as to require exertion in swinging them into operating position.

This has been a problem in connection with the coupling of large diameter pipe sections where the clamping bolts are hinged at one end, for in such installation, the bolts are of substantial size and represent substantial weight, particularly under the conditions encountered in assembling such pipe sections for dredging of the like operations.

A further feature of the present invention resides in the utilization of the continuous flange, namely the ring section flange in the present instance, in combination with clamping bolts as the clamping means for effecting a tight assembly of the coupling components.

In prior constructions involving clamping bolts, suitable lugs at spaced peripheral locations on the ring section were provided for engagement by suitable bolts mounted on the bell section. In effecting a clamping of the components of the coupling, it was necessary to first align the lugs with the clamping bolt before such lugs could be engaged by the clamping bolts. When working with pipe sections of large diameter, this of course can not be deemed a light operation.

In the present device, not only does the use of such flange simplify the design and construction of the coupling, but the need for aligning of the components of the coupling in the manner previously indicated, has now been completely eliminated, for the clamping bolts may engage the ring section flange at any point on its circumference with equal effectiveness.

Thus from a description of the preferred embodiment of my invention as illustrated in the drawing, it will be apparent that it fulfills all the objects of my invention as previously recited, and, while I have disclosed such preferred embodiment in considerable detail, I do not desire to be limited in my protection to such detail, except as may be necessitated by the appended claims.

I claim:

1. In a universal pipe coupling, a section; a plurality of bolts, each terminating at its head end in a hook and having its tail end threaded; a tightening nut threaded on each bolt; and means pivotally anchoring said bolts to said section at spaced peripheral locations, said means including a lug for each bolt pivotally secured to said section at its prescribed location, such lug having a passage therethrough for slidably receiving a bolt to permit arbitrary positioning of the same in such lug with its center of gravity to one side or the other of the center of said lug, preliminary to assembling said section in said coupling.

2. In a universal pipe coupling of the type having a bell section and a ball section receivable therein; a ring section fitting about the crown of said ball section and terminating in a flange facing said bell section when said ball section is received in said bell section, said flange having a rearwardly directed peripheral lip; a plurality of bolts, each terminating at its head end in a hook adapted to fit over and hook under said peripheral lip, said bolts each having its tail end threaded; a tightening nut threaded on each bolt; and means pivotally anchoring said bolts to said bell section at spaced peripheral locations, said means including a lug for each bolt pivotally secured to said bell section at its prescribed location, such lug having a passage therethrough for slidably receiving a bolt to permit arbitrary positioning of the same in such lug with its center of gravity to one side or the other of the center of said lug, preliminary to assembling said ball section into said bell section.

3. On a universal pipe coupling of the type involving a bell section and a ball section fitting therein, means for binding said two sections against separation, said means including a lateral flange along the terminal edge of said bell section, a ring section fitting about the crown of said ball section and having a lateral flange facing said bell section flange, a plurality of lugs peripherally spaced about one of said flanged sections, each pivotally secured thereto adjacent said section flange so as to abut the same when such lugs are normal to the axis of said section, said lugs each having a bolt receiving passage therethrough at approximately the elevation of said section flange, a bolt extending through each lug and engaging said other section flange, and means on said bolts drawing such sections into assembly with said lugs braced against said section flange.

4. In a universal pipe coupling of the type involving a bell section and a ball section fitting therein, means for binding said two sections against separation, said means including a lateral flange along the terminal edge of said bell section, a ring section fitting about the crown of said ball section and having a lateral flange facing said bell section flange, a plurality of lugs peripherally spaced about said bell section, each pivotally secured thereto adjacent said bell section flange so as to abut the same when such lugs are normal to the axis of said bell section, said lugs each having a bolt receiving passage therethrough at approximately the elevation of said bell section flange, and a bolt extending through each lug and engaging said ring section flange, each of said bolts having its tail end threaded, and a tightening nut threaded thereon into pressure engagement with its associated lug to draw said sections into assembly with said lugs braced against said bell section flange.

5. A universal joint for connecting two pipe components, comprising a bell section for attachment to one component and a ball section for attachment to the other component and receivable in said bell section, a ring section encircling and fitting about the crown of said ball section, said ring section and bell section having confronting flanges, said ball section flange having a continuous circular peripheral edge, a plurality of bolt assemblies disposed at spaced peripheral locations about said bell section adjacent said bell section flange, each of said assemblies including a lug pivotally secured to said bell section and having a bolt passage therethrough, a bolt slidably supported in said lug passage and having a hooked head end adapted to engage said ring section flange at any peripheral point thereon and a threaded tail end for receiving a clamping nut.

JOHN G. SJOBERG.

REFERENCES CITED

The following references are of record in the file of this patent:

UNITED STATES PATENTS

| Number | Name | Date |
|---|---|---|
| 1,946,110 | Plummer | Feb. 6, 1934 |
| 2,134,314 | O'Donnell | Oct. 25, 1938 |